United States Patent [19]
Suzuki et al.

[11] 3,853,578
[45] Dec. 10, 1974

[54] METHOD OF MANUFACTURING DECORATIVE BOARDS WITH DEPRESSION PATTERNS

[75] Inventors: Masaru Suzuki, Yashio; Kenichi Yamazaki, Tokyo, both of Japan

[73] Assignee: Senri Kikaku Sogo Kabushiki Kaisha, Tokyo, Japan

[22] Filed: Sept. 8, 1972

[21] Appl. No.: 287,532

[52] U.S. Cl.................. 117/8.5, 117/41, 117/93.31, 117/161 K
[51] Int. Cl. ........ B44d 1/50, B44d 1/52, C08f 3/50
[58] Field of Search ............ 117/10, 5.5, 93.31, 8.5, 117/37 R, 41, 161 K

[56] References Cited
UNITED STATES PATENTS

| | | | |
|---|---|---|---|
| 3,002,848 | 10/1961 | Clark | 117/5.5 X |
| 3,511,687 | 5/1970 | Keyl et al. | 117/93.31 X |
| 3,588,570 | 6/1971 | O'Keeffe | 117/5.5 X |
| 3,658,528 | 4/1972 | Berman et al. | 117/93.31 |
| 3,669,716 | 6/1972 | Keyl et al. | 117/72 X |
| 3,712,816 | 1/1973 | Blome et al. | 117/5.5 X |

*Primary Examiner*—William D. Martin
*Assistant Examiner*—John H. Newsome
*Attorney, Agent, or Firm*—Armstrong, Nikaido & Wegner

[57] ABSTRACT

Decorative boards having depression patterns are obtained by applying to a patterned or colored substrate board an unsaturated polyester resin capable of being cured by irradiation of ultraviolet rays, covering a coating layer of said resin with a shading film formed of a photo-transmissible material and having thereon a shading pattern corresponding to a depression pattern to be formed in the resinous layer, irradiating the aforesaid resinous layer through the aforesaid shading film by ultraviolet rays to cure the resin in irradiated areas and peeling off the shading film. In case of decorative boards having a pattern like a face of laid bricks or tiles or stained glass where the shaded or unirradiated areas have relatively wide widths, uncured resin in the shaded areas is taken out with the shading film leaving depressions in the layer of cured resin. The resinous layer is, as it is or after application of a colorant to the depressions, cured completely to obtain a decorative board having a three-dimensional pattern of a reality.

17 Claims, No Drawings

METHOD OF MANUFACTURING DECORATIVE BOARDS WITH DEPRESSION PATTERNS

BACKGROUND OF THE INVENTION

This invention relates to a method of manufacturing decorative boards having depression patterns. In more detail, it is concerned with a method of manufacturing decorative boards having depression patterns giving a stereographical sense of beauty by forming a desired depression pattern on a base board making use of characteristics of an unsaturated polyester resin capable of being cured by irradiation of ultraviolet rays.

Depression-patterned decorative boards or embossed decorative boards have been in general manufactured by forming a depression pattern in a patterned surface of a base board having a directly printed pattern or overlaid with a printed paper or plastic film by means of an embossing roller and then applying a finish coating to the embossed surface. In another way, depression patterns have been made by applying a liquid coating to a patterned surface of a base board, putting an embossed sheet material, e.g. embossed plastic sheet, close over the coated surface and, after curing of the coating, peeling off the embossed sheet material.

For instance, in the manufacture of depression-patterned decorative boards using an unsaturated polyester resin, a polyvinyl acetate-based binder is applied to a surface of a base board by means of a roller coater, a patterned paper having, e.g., a printed grainy pattern is applied thereover by means of a laminator or hot press, an unsaturated polyester resin is then applied to the patterned paper by means of a flow coater, an embossed or otherwise depression-patterned sheet material, e.g. polyethylene terephthalate film, is put close over the patterned paper and, after deaeration by means of a roller, the assembly is heated by means of, e.g., infrared rays or hot air to cure the resin. The embossed sheet material is then peeled off to obtain a decorative board having a depression pattern in its coated surface.

However, the prior methods need a number of embossing rollers in accordance with the number of printed patterns on base boards. In addition, in the manufacture of decorative boards having grainy patterns in the prior methods, it is necessary to provide a precise embossing roller every printed grainy pattern to form a grainy pattern of a reality. However, the embossing roller is of a high price and requires a long working time for the manufacture thereof to make the product expensive and elongate the period from the planning of a new product to the supply of the new product to market.

Moreover, it is difficult in the prior methods to give likeness to joints of laid bricks or tiles or stained glass or pattern of laid stones to depressions since the color and texture of depressions depend on the printed pattern on a base board and the coating used.

Accordingly, it is an object of the present invention to provide a method of manufacturing depression-patterned decorative boards of a good quality at a high production rate with a low cost without expense of a high cost of equipment.

Another object of the present invention is to provide depression-patterned decorative boards having depressions of a reality.

SUMMARY OF THE INVENTION

In accordance with the present invention, depression-patterned decorative boards are obtained by applying an unsaturated polyester resin capable of being cured by irradiation of ultraviolet rays to a printed or colored base board, covering the layer of the aforesaid resin with a shading film formed of a photo-transmissible material and having thereon a shading pattern corresponding to a depression pattern to be formed, irradiating the layer of the unsaturated polyester resin through the shading film by ultraviolet rays to cure the resin in irradiated areas and peeling off the shading film to leave depressions in unirradiated or shaded areas.

In case where the unirradiated areas have wide widths, the uncured resin in the unirradiated areas is taken out together with the shading film upon removal of the shading film leaving depressions. The residual uncured resin in the unirradiated areas is then cured by irradiation of ultraviolet rays immediately after removal of the shading film or after application to the depressions of a colorant to obtain a better result.

DETAILED DESCRIPTION

Illustrating in more detail, on a surface of a base board there is directly printed a decorative pattern like a wood grain, layed bricks, tiles or stones or stained glass or a single color or there is applied with a polyvinyl acetate resin or like binder a decorative paper having such a printed pattern as mentioned above by means of a roller coater or laminator and thereover is applied an unsaturated polyester resin capable of being cured by irradiation of ultraviolet rays by means of a flow coater or roller coater. On the coated surface of the base board there is put close a shading film prepared by printing with an ultraviolet-untransmitting ink a pattern corresponding to vessels in a wood grain pattern or joints of laid bricks or tiles or a any desired pattern on a photo-transmitting sheet material, in the manner such that the pattern on the base board coincides with that on the shading film, and air bubbles in the resin layer are removed by means of a deairation roller. Alternately, the coated surface may be covered with an unprinted lucid film and, after deaeration, with a printed shading film over the lucid film.

Irradiating the resin layer through the shading film by ultraviolet rays, the resin is cured in irradiated areas within few minutes because the coating layer is of an ultraviolet-curable unsaturated polyester resin, but remains uncured in unirradiated or shaded areas. When the shaded areas are of a narrow width as in case of vessels in a wood grain pattern, the resin in the shaded areas also cures, while delayed, by exposure for a period of time, though there are formed V-shaped grooves as a result of shrinkage of formerly cured irradiated or exposed areas. Namely, when the shaded areas are of a narrow width, the resin in the shaded areas are also cured slowly by scattered rays from exposed areas. The boundary between exposed area and shaded area is sharp in the vicinity of the surface of the coating layer but becomes dim as comes near the surface of the base board because of scattering of rays to form V-sectioned shadow and, according to material, the base absorbs portion of the resin, so that the uncured areas are depressed within a certain irradiation time to form depressions.

On the contrary, when the shaded areas are of a wide width as in case of joints in a laid brick pattern, the resin in the shaded areas except peripheral portions thereof is remained uncured because the resin in the shaded areas is irradiated little. Accordingly, peeling off the shading film after completion of irradiation, cured resin in irradiated areas completely separates from the film but portion of uncured resin in the shaded areas is removed sticking to the film to leave depressions with grained surface. Curing the uncured resin in the depressions, the shaded areas forms matted depression pattern like joints of laid bricks, tiles or stones. The curing of uncured resin in the depressions may be attained by re-irradiation by ultraviolet rays. Alternately, it may be attained by heating if there has previously been incorporated a curing catalyst in the resin.

Joint-like pattern of a reality is obtained by performing the curing of the depressions after application thereto of a colorant, such as, e.g., Portland cement, white cement or titanium white. Although the curing of the depressions is attained by re-irradiation when the colorant is used in a small amount or the colorant used is photo-transmissible, in case where there is used a colorant in a larger amount or a colorant used is untransmissible, the curing is attained at room temperature or somewhat elevated temperatures by incorporating a benzoyl peroxide, methyl ethyl ketone peroxide or like curing catalyst in a resin to be used and incorporating a dimethylaniline, cobalt naphthenate or like accelerator in a colorant used. Alternately, there may be incorporated an accelerator in the resin and a curing catalyst in the colorant.

The "ultraviolet-curable unsaturated polyester resin" as used in the practice of the present invention includes unsaturated polyester resins prepared by incorporating a photosensitizer, such as benzoin ether of a primary or secondary alcohol, in an unsaturated polyester resin consisting of a mixture of an unsaturated polyester derived from an unsaturated dicarboxylic acid or its anhydride and a polyhydric alcohol with an ethylenically unsaturated monomer.

The unsaturated dicarboxylic acid and anhydride as an constituent of the aforesaid unsaturated polyester includes maleic anhydride, fumaric acid, itaconic acid, citraconic acid and the like portion of which is usually substituted by a saturated polycarboxylic acid, such as, e.g., succinic acid, succinic anhydride, glutaric acid, adipic acid, phthalic anhydride, isophthalic acid, tetrachlorophthalic acid, hexachloroendomethylenetetrahydrophthalic acid and trimellitic anhydride. The polyhydric alcohol includes ethylene glycol, diethylene glycol, propylene glycol, dipropylene glycol, butanediol, hexanediol, trimethylolpropane, pentaerythritol and the like. The ethylenically unsaturated monomer includes styrene, α-methylstyrene, vinyltoluene, methyl methacrylate, diallyl phthalate, triallyl isocyanurate and the like.

Typical examples of the photosensitizers are benzoin methyl ether, benzoin ethyl ether, benzoin n-propyl ether, benzoin n-butyl ether, 4,4'-dichlorobenzoin ethyl ether, 4,4'-dimethoxybenzoin ethyl ether, benzoin sec-butyl ether and like benzoin ethers.

In the aforesaid resin there may be, of course, incorporated, in addition to the photosensitizer, a polymerization inhibitor, a stabilizer, paraffin, pearl essence, transparent pigment and other conventional additives.

The aforesaid resin is applied to a base in a varying amount depending on a final end, in usual in an amount of 100 to 5,000 gr/m².

As the base board there may be used plywood, fiber board, particle board, plastic sheet, asbestos board, metallic sheet and other sheet materials including cloth and fibrous mat so long as it can be converted to a smooth-surfaced sheet material capable of being bonded with the resin, by some treatment. There may also be used colored or uncolored fiber reinforced plastic sheets.

The photo-transmittable film includes regenerated cellulose film, polyethylene terephthalate film, polyethylene film, polypropylene film, polyvinyl chloride film and like lucid films, which is processed by printing thereon a pattern corresponding to a depression pattern to be formed on the base board with an ultraviolet shielding ink by means of a printing plate prepared in a phototype process to a shading film.

The colorant to be applied to the depressions includes Portland cement, white cement, titanium white and other various pigments.

As mentioned above, in accordance with the process of the present invention, depressions are very easily formed exactly in desired positions by applying an ultraviolet-curable unsaturated polyester resin to a base board, irradiating ultraviolet rays through a film having transmitting areas and shading areas to locally cure the coated unsaturated polyester resin and peeling off the aforesaid film. The method of the present invention is inexpensive and efficient because of unnecessity of any high cost of equipment and skill of workers. In addition, it is possible to represent a distinctive colored joint with a high reality by applying a cement, titanium white, black pigment or like powdery colorant to the uncured resin in the depressions and curing the resin. Namely, it is possible to obtain at a low cost depression-patterned decorative boards having a pattern like joints of laid bricks, tiles or stones or other desired pattern with a reality.

In the following Examples all percentages and parts are by weight unless otherwise indicated.

EXAMPLE 1

To a 4 mm thick plywood there was applyed a polyvinyl acetate binder in the amount of 80 gr/m² by means of a roller coater and set to touch (semi-dried state in which there remains a fingerprint when lightly pressed by a finger), then applied thereto a titanium white-loaded paper of a weight of 80 gr/m² having straight grained pattern by means of a laminator. A 60 % solution of an unsaturated polyester derived from a mixture of 1.55 mol of maleic anhydride, 0.92 mol of phthalic anhydride and 2.57 mol of propylene glycol in styrene was prepared. The unsaturated polyester resin thus obtained was added with 1.5 % of benzoin n-propyl ether and 0.003 % of copper naphthenate. The ultraviolet-curable unsaturated polyester resin thus obtained was applied to the surface of the aforesaid decorative paper, in an amount of 150 gr/m² by means of a flow coater. A transparent polyethylene terephthalate film on which had been printed with a black ink a precise pattern corresponding to the design in the straight grain pattern on the decorative paper was put close over the coated surface in the manner such that the pattern on the film exactly coincides with the printed pattern on the substrate and the coating layer was deairated. The assembly was then irradiated for 6 minutes by ultraviolet lamps, Toshiba fluorescent chemical lamp 40 W-FL 40 EL, emitting ultraviolet rays having a peak at about 360 m μ of wave length located 100 mm above the coated surface in parallel at intervals of 100 mm to obtain a depression-patterned decorative board having a depression pattern like that of a natural wood which corresponded with grainy patterns printed on the film.

EXAMPLE 2

To a surface of a 4 mm thick clacium silicate board there was applied a polyvinyl acetate emulsion binder in an amount of 80 gr/m² by means of a spreader. A titanium white-loaded unprinted paper of a weight of 80 gr/m² was applied to the coated surface and a pattern of laid tiles was printed thereon by means of a photogravure printing machine. An ultraviolet-curable unsaturated polyester resin as used in Example 1 was added with 1.5 parts, per 100 parts of the resin, of a 10 % solution in styrene of a paraffin wax of a melting point of 52 – 53°C and applied by means of a flow coater to a surface of the aforesaid titanium-loaded paper in an amount of 200 gr/m². The coating layer was covered by a polyvinyl alcohol film and deaerated.

A polyethylene terephthalate film having a black printed pattern corresponding to the joint in the printed pattern on the titanium-loaded paper was put close over the resin coated surface and fixed thereto. The assembly was irradiated for 7 minutes by ultraviolet rays under the same conditions as in Example 1 and the film was then peeled off. The resin in the shaded areas corresponding to the joint remained uncured and was taken out sticking to the film as the film was peeled off leaving depressions. The board was irradiated by ultraviolet rays for additional 5 minutes to obtain a depression-patterned board with a realistic sence of beauty in which edges of protruding areas corresponding to tiles were rounded.

EXAMPLE 3

To a surface of a 4 mm thick plywood there was applied a polyvinyl acetate emulsion binder in an amount of 70 gr/m² by means of a spreader and, after dried at 80 C for 1 minute in a dryer, there was applied by means of a laminator a titan-loaded paper of a weight of 80 gr/m² having a printed pattern of wood grain. There was then applied thereto an ultraviolet-curable unsaturated polyester resin as used in Example 1 containing 1.5 % of benzoin methyl ether in an amount of 250 kg/m². A polyethylene terephthalate film having a precise black printed pattern corresponding to vessels in the wood grain pattern on the titan paper was put close over the resin coated paper in the manner such that the both patterns well coincided and, after deaeration, the assembly was irradiated for 3 minutes by means of a light source consisting of a plurality of ultraviolet lamps, National high power photopolymerization fluorescent lamp FLR 60 EH-BA 37/AC, located 100 mm above the coated surface in parallel at intervals of 200 mm. The film was then peeled off to obtain a decorative board having tiny depressions corresponding to the vessels in the printed pattern on the titania paper.

EXAMPLE 4

To a 4 mm thick plywood there was applied with an 80 gr/m² of a polyvinyl acetate emulsion binder by means of a laminator a patterned paper having a pattern of layed stones of a weight of 50 gr/m², then applied thereover an ultraviolet-curable unsaturated polyester resin as used in Example 2 in an amount of 400 gr/m² by means of a flow coater. The coated surface was covered by a transparent polyvinyl alcohol film. The film was tensioned to eliminate wrinkles and air bubbles between the film and the coating layer was taken out. A 0.15 mm thick poly(ethylene terephthalate) film having a printed black pattern corresponding to the joint in the printed pattern of layed stone on the patterned paper was superposed on and fixed to the layer of the unsaturated polyester resin in the manner such that both patterns coincided well. The assembly was irradiated for 10 minutes under the similar conditions as in Example 1. The aforesaid poly(ethylene terephthalate) film and then the polyvinyl alcohol film were removed. The coating layer of the resin in irradiated areas was completely cured and had smooth lustrous surface but, in shaded areas, most portion of uncured resin was taken out with the polyvinyl alcohol film leaving depressions having grainy surfaces. To the depressions there was dusted Portland cement and the board was irradiated again for 4 minutes to obtain a decorative board having mat-surfaced depressions with a reality corresponding to the joint of an original layed stone.

EXAMPLE 5

To a sheet glass there was applied by a cloth a thin layer of a silicone mold releasing agent, Toshiba TSM 650, then cast thereon an unsaturated polyester resin containing 0.1 % of cobalt naphthenate as an accelerator, 2 % of methyl ethyl ketone peroxide as a curing catalyst and 0.15 % of paraffin in a thickness of 3 mm. The cast resin was cured at 30°C for 30 minutes. The same ultraviolet-curable unsaturated polyester resin as in Example 2 was added with 2 % of benzoyl peroxide and applied thin to the cured layer of the unsaturated polyester on the glass sheet and a Japanese paper having a colored printed pattern of a stained glass was superposed thereon. The aforesaid ultraviolet-curable unsaturated polyester resin containing 2 % of benzoyl peroxide was then applied over the printed Japanese paper in a thickness of 3 mm. The Japanese paper became clear as the resin penetrated thereinto to give a multi-colored stained glass-like assembly. The assembly was covered with a lucid poly(ethylene terephthalate) film having a printed pattern of a untransmittable ink corresponding to the joint in the stained glass pattern on the Japanese paper and irradiated for 4 minutes by ultraviolet rays under the similar conditions as in Example 3. When the film was peeled off, uncured resin in shaded areas was taken out sticking to the film leaving depressions corresponding to the joint. A black pigment incorporated with 3 % of a 10 % solution in styrene of dimethylaniline as an accelerator was spread in an amount of 100 gr/m² all over the resinous layer and allowed to stand still at room temperature for 5 minutes. After curing, excessive pigment was brushed off to obtain a imitation stained glass having depressed black-colored joints.

EXAMPLE 6

To a 4 mm thick plywood there was applied by means of a roller coater a polyvinyl acetate emulsion binder in an amount of 80 gr/m² and, after set to touch of the binder, there was applied by means of a laminator a titania paper of a weight of 80 gr/m² having a pattern of layed tiles. A similar ultraviolet-curable unsaturated polyester resin containing 2 % of benzoyl peroxide, as in Example 2, was applied thereto in an amount of 300 gr/m² by means of a flow coater. The coating layer was covered by a lucid polyvinyl alcohol film as in Example 4 and, after deaeration, a 0.15 mm thick poly(ethylene terephthalate) film having a pattern corresponding to the joint in the pattern of laid tiles which had been written with a black ink. The assembly was irradiated for 7 minutes by ultraviolet rays as in Example 1 and the films were peeled off. The exposed areas of the coating layer had completely been cured, but shaded areas were uncured and most portion of resin was removed sticking to the film leaving depressions in the coating layer. The coated board was, after a titanium white mixed with 3 % of a 10 % solution in styrene of dimethylaniline as accelerator had been spread thereover, reirradiated for 2 minutes to obtain a decorative board having a depression pattern like laid tiles.

EXAMPLE 7

The same procedure as in Example 6 was repeated except that there were used a titania paper having a pattern of laid bricks and as a colorant a white cement. There was obtained a decorative board having a depression pattern like laid bricks with a reality.

What is claimed is:

1. A method of manufacturing a depression patterned decorative board comprising applying an ultraviolet-curable unsaturated polyester resin to a surface of a printed or colored base board, covering the coated surface with a shading film formed of a phototransmissible material and having thereon a shading pattern corresponding to a depression pattern to be formed in the coating layer of the aforesaid resin, said film being adhesive to the resin in its incured state but strippable from the cured resin irradiating the coating layer by ultraviolet rays through the said film thereby to cure the resin in the exposed areas and peeling off the said film from the coated layer whereby at least a portion but not all of the unexposed resin is removed with the film thereby providing a depressioned-patterned decorative board having a depression pattern in the polyester surface coating thereof corresponding to the pattern of the shading film.

2. A method according to claim 1, wherein the coated surface is first covered by an unpatterned transparent film and then by the shading film, and said unpatterned transparent film is adhesive to the resin in its uncured state but strippable from the cured resin and wherein both films are peeled from the coated layer.

3. A method according to claim 1, wherein the base board is a plywood overlaid with a printed paper.

4. A method according to claim 1, wherein the base board is a plastic sheet.

5. A method according to claim 1, wherein the shading film is a poly(ethylene terephthalate) film having a pattern drawn with a black ink.

6. A method of manufacturing depression-patterned decorative boards comprising applying an ultraviolet-curable unsaturated polyester resin to a surface of a patterned or colored base board, covering the coated surface by a shading film formed of a phototransmissible material and having thereon a shading pattern corresponding to a depression pattern to be formed in the coating layer of the said resin said film being adhesive to the resin in its uncured state but strippable from the cured resin, irradiating the coating layer by ultraviolet rays through the said shading film, peeling off the said film thereby curing the resin in the exposed areas and curing the resin in the depressions formed by the peeling-off of the said film whereby at least a portion but not all of the unexposed resin is removed with the film thereby forming depressions in the polyester surface coating.

7. A method according to claim 6, wherein the curing of the resin in the depressions is carried out by irradiation of ultraviolet rays.

8. A method of manufacturing depression-patterned decorative boards comprising applying an ultraviolet-curable unsaturated polyester resin to a surface of a patterned or colored base board, covering the coated surface by a shading film formed of a phototransmissible material and having thereon a shading pattern corresponding to a depression pattern to be formed in the coating layer of the said resin said film being adhesive to the resin in its uncured state but strippable from the cured resin, irradiating the coating layer by ultraviolet rays through the said shading film to cure the said resin in exposed areas, peeling off the said film whereby at least a portion but not all of the unexposed resin is removed with the film thereby forming depressions in the polyester surface coating, spreading a colorant on the depression formed by the peeling-off of the said film and curing the uncured resin in the depressions.

9. A method according to claim 8, wherein the coating layer is first covered by a transparent unpatterned film which transparent unpatterned film is adhesive to the resin in its uncured state but is strippable from the cured resin and then by the said shading film and wherein both films are peeled from the coated layer.

10. A method according to claim 8, wherein the base board is a plywood overlaid with a printed paper.

11. A method according to claim 8, wherein the base board is a plastic sheet.

12. A method according to claim 8, wherein the shading film is a poly(ethylene terephthalate) film having a pattern drawn with a black ink.

13. A method according to claim 8, wherein the colorant is Portland cement.

14. A method according to claim 8, wherein the colorant is titanium white.

15. A method according to claim 8, wherein the colorant is a pigment.

16. A method according to claim 8, wherein the ultraviolet-curable unsaturated polyester resin contains a curing catalyst.

17. A method according to claim 8, wherein the colorant contains a curing accelerator.

* * * * *